US012731104B2

(12) United States Patent
Hammond et al.

(10) Patent No.: US 12,731,104 B2
(45) Date of Patent: Sep. 8, 2026

(54) SYSTEMS AND METHODS OF TRACKING GEOGRID MATERIALS

(71) Applicant: Tensar International Corporation, Alpharetta, GA (US)

(72) Inventors: Matthew Hammond, Alpharetta, GA (US); Branden Reall, Alpharetta, GA (US); John Wallace, Alpharetta, GA (US)

(73) Assignee: Tensar International Corporation, Alpharetta, GA (US)

( * ) Notice: Subject to any disclaimer, the term of this patent is extended or adjusted under 35 U.S.C. 154(b) by 74 days.

(21) Appl. No.: 18/873,174

(22) PCT Filed: Jun. 9, 2023

(86) PCT No.: PCT/US2023/024943

§ 371 (c)(1),
(2) Date: Dec. 9, 2024

(87) PCT Pub. No.: WO2023/239911

PCT Pub. Date: Dec. 14, 2023

(65) Prior Publication Data

US 2025/0315782 A1 Oct. 9, 2025

Related U.S. Application Data

(60) Provisional application No. 63/350,558, filed on Jun. 9, 2022.

(51) Int. Cl.
*G06Q 10/087* (2023.01)
*G16Y 20/10* (2020.01)
(Continued)

(52) U.S. Cl.
CPC ............ *G06Q 10/087* (2013.01); *G16Y 20/10* (2020.01); *G16Y 40/50* (2020.01); *H04W 4/029* (2018.02)

(58) Field of Classification Search
CPC ...... G06Q 10/087; G16Y 20/10; G16Y 40/50; H04W 4/029
See application file for complete search history.

(56) References Cited

U.S. PATENT DOCUMENTS

2013/0030704 A1* 1/2013 Young ...................... G01V 1/00 702/5
2019/0113632 A1 4/2019 Lucrecio
(Continued)

FOREIGN PATENT DOCUMENTS

WO 2021155364 A1 8/2021
WO 2023009889 A1 2/2023

OTHER PUBLICATIONS

International Search Report and Written Opinion issued in counterpart PCT Application No. PCT/US2023/024943 dated Oct. 17, 2023 (twenty-one (21) pages).

*Primary Examiner* — Florian M Zeender
*Assistant Examiner* — Kimberly S. Bursum
(74) *Attorney, Agent, or Firm* — E. Eric Mills; Bryan L. Baysinger; Maynard Nexsen PC

(57) ABSTRACT

Disclosed are various aspects for systems and methods of lifecycle tracking, coordinate tracking, and inventory management of geogrid materials utilizing an IoT platform configured with software for accepting data from a multi-sensor tracking unit. In one aspect, a multi-sensor tracking unit is affixed to geogrid material, wherein the unit transmits information acquired from a plurality of sensors back to the IoT platform hosted on a server. The IoT platform processes the information and derives insight into the geogrid's logistics, including its route from the manufacturing facility to final install, the weather incurred, and logistics around supply. In other aspects, methods for processing data, including accessing API's to derive additional information about the geogrid's transportation path, delivery, and install
(Continued)

through information acquired from the multi-sensor tracking unit and processing by the IoT platform.

16 Claims, 8 Drawing Sheets

(51) Int. Cl.
*G16Y 40/50* (2020.01)
*H04W 4/029* (2018.01)

(56) References Cited

U.S. PATENT DOCUMENTS

| | | | | |
|---|---|---|---|---|
| 2020/0242549 | A1 | 7/2020 | Daoura | |
| 2021/0272056 | A1 | 9/2021 | Hamm | |
| 2022/0083048 | A1* | 3/2022 | Cella | G05B 23/0294 |
| 2022/0156682 | A1* | 5/2022 | Rai | G06Q 10/0838 |

* cited by examiner

SYSTEMS AND METHODS OF TRACKING GEOGRID MATERIALS

CROSS-REFERENCE TO RELATED APPLICATIONS

The present application is a 35 U.S.C. § 371 U.S. national phase entry of International Application No. PCT/US2023/024943 having an international filing date of Jun. 9, 2023, which claims the benefit and priority to U.S. Provisional Patent Application No. 63/350,558, filed on Jun. 9, 2022, entitled Systems and Methods of Tracking Geogrid, the contents of which are incorporated herein by reference.

FIELD

The present invention relates generally to logistics and information gathering around moving and transporting geogrid materials. In particular, hardware elements and processes in tracking geogrid materials utilizing an IoT platform in connection with sensors and communications technologies such as global positioning systems, cellular technology, and satellite communications are disclosed.

BACKGROUND

Geogrid is typically a synthetic material used in civil engineering and construction projects. Often times it is a flexible, high strength mesh or grid-like structure made from compositions of polymers and additives. Geogrids may comprise intersecting ribs or strands and nodes, and form open spaces for trapping soils and sediments. When installed in soil, geogrids create strong interactions between the soil particles and the grid structure. The interaction helps distribute loads more evenly, and increases the soil's shear strength.

Geogrid is typically used on civil construction projects, such as projects involving roads, rail track, walls and slopes, and marine environments. Geogrid is manufactured through processes such as extrusion, along with other mechanical and chemical steps, such as stretching or punching the geogrid, or applying chemical properties, such as additives, to the geogrid. Once formed, geogrid is often wound or formed into geogrid rolls or other configurations, which are optimal for packaging and transporting to a site or holding facility, and then ultimately to an install location. These materials may be quite large and may have various specifications depending on the type of geogrid manufactured, including the geogrid pattern, polymeric or other materials, and additives, to name a few.

The logistical side of manufacturing, packaging, transporting, and delivering geogrid is one that often moves through several channels, including through rail, truck/lorry, air, and over sea. Traditionally, geogrid is shipped from the manufacturer's facility to a distributor who stocks the geogrids, wherein the distributor eventually ships to an end consumer site. Thus, the lifecycle of geogrids cannot be easily maintained by the manufacturer once it leaves its facility. Further, geogrids are often made from polymers, which may degrade in quality when introduced to direct sunlight for an extended period of time. Also, as delivery often involves an intermediary distributor, it can be difficult or impossible for a manufacturer to know when and where the geogrid will be installed. There is a long-sought need to better understand the lifecycle of geogrids, including location-based understanding, sun exposure, and elemental exposure, all of which can aid in further improving how geogrid is manufactured, transported, and sold. The disclosure herein proposes embodiments to provide real time insight into the lifecycle and logistical operations of geogrid material, including business functions of identifying and optimizing stock at distributors and factories, understanding the type and quantity of geogrid that was used at a given site, and optimizing manufacturing and logistics.

SUMMARY

Disclosed herein are various aspects of hardware and computer implemented systems and methods for acquiring data around geogrid materials, including polymeric geogrids, geofabrics, and geotextiles. In some aspects, the techniques described herein relate to a hardware implemented method for acquiring data around geogrid from manufacture to installation, including: provisioning an Internet of Things (IoT) platform on a server, wherein provisioning hosts the IoT platform on the server that grants access to one or more client computing devices; attaching a multi-sensor tracking unit to a geogrid; wherein attaching either temporarily or permanently adheres the multi-sensor tracking unit to the geogrid; acquiring geogrid information from the multi-sensor tracking unit attached to the geogrid, wherein the geogrid information includes at least a current location; transmitting the geogrid information acquired by the multi-sensor tracking unit through a wireless network to the IoT platform; generating, by the IoT platform, a timeline or map including one or more location points from the geogrid information acquired by the multi-sensor tracking unit; and accessing, by the one or more client computing devices, the IoT platform to view the timeline or map.

In some aspects, the techniques described herein relate to a method, further including calculating by the IoT platform, duration information of time the geogrid spent at a geolocation, and accessing, by the one or more client computing devices, the IoT platform that includes a timeline or map that includes the duration information. In some aspects, the techniques described herein relate to a method, wherein the multi-sensor tracking unit acquires the information at least every 60 minutes. In some aspects, the techniques described herein relate to a method, further including the IoT platform acquiring weather information based on at least the current location of the multi-sensor tracking unit, and associating the weather information with the timeline or map. In some aspects, the techniques described herein relate to a method, further including acquiring, from the multi-sensor tracking unit, environmental information including temperature, humidity, and an ambient light value, and transmitting the environmental information to the IoT platform, and accessing, by the one or more client computing devices, the IoT platform that includes a timeline or map that includes the environmental information. In some aspects, the techniques described herein relate to a method, wherein transmitting information acquired from the multi-sensor tracking unit is dependent upon a request from the one or more client computing devices. In some aspects, the techniques described herein relate to a method, further including decreasing transmission rate frequency from the multi-sensor tracking unit when the geogrid is placed into a geotechnical environment to save on battery consumption, based on at least the ambient light value, or an RFID signal, or a signal from the one or more client computing devices. In some aspects, the techniques described herein relate to a method, wherein the environmental information further includes moisture information and salinity information. In some aspects, the techniques described herein relate to a method, further including the IoT platform alerting the client computing device when the multi-sensor tracking unit enters the geotechnical environment or when the multi-sensor tracking unit fails to send the information. In some aspects, the techniques described herein relate to a method, further including transmitting, by the tracking unit, information about when the tracking unit is placed into ground.

In some aspects, the techniques described herein relate to a hardware implemented method for inventory management of geogrids, including: provisioning an Internet of Things (IoT) platform on a server, wherein provisioning hosts the IoT platform on the server that grants access to one or more client computing devices; attaching a multi-sensor tracking unit to a geogrid; wherein attaching, either temporarily or permanently, adheres the multi-sensor tracking unit to the geogrid; transporting the geogrid with a multi-sensor tracking unit to a distributor; acquiring, by the one or more client computing devices, geogrid information from the multi-sensor tracking unit attached to the geogrid, wherein the geogrid information includes at least a current location and a unique product identifier; receiving, by the IoT platform from the multi-sensor tracking unit, a notification the geogrids has left the distributor's location; and triggering a financial transaction based on the geogrid information from the multi-sensor tracking unit that the geogrid is no longer at the distributor location. In some aspects, the techniques described herein relate to a method, further including calculating inventory at the distributor based on a count of the multi-sensor tracking unit and the unique product identifier. In some aspects, the techniques described herein relate to a method, further including the IoT platform reporting inventory quantity of the distributor based on at least the geogrid information, to the one or more client computing devices. In some aspects, the techniques described herein relate to a method, further including scheduling a delivery of additional geogrid based on the count of the multi-sensor tracking units at the distributor.

In some aspects, the techniques described herein relate to a method, further including querying by the one or more client computing devices, the IoT platform for the geogrid information, wherein the querying imports a product name, product dimension, and a date of manufacture from a repository based on the product identifier from the multi-sensor tracking unit. In some aspects, the techniques described herein relate to a method, wherein the multi-sensor tracking unit includes a GPS module and a gyroscope. In some aspects, the techniques described herein relate to a method, wherein the multi-sensor tracking unit further includes a hardened enclosure with one or more tabs in which the one or more tabs protrude to allow for the attaching of the multi-sensor tracking unit with a zip-tie.

Further, said systems and methods may be executed on various computing systems and may include features and hardware such as multi-sensor tracking units. In another aspect, a system for tracking geogrid materials and geogrid inventory management is disclosed. The system comprises a geogrid material, a multi-sensor tracking unit attached to the geogrid material, a server configured to host an IoT platform, and at least one client computing device. The system further comprises a program executed in the at least one client computing device located at a distributor location. The program comprises accessing a storage component, such as a relational database, to hold information for the IoT platform. Further, the client computing devices may have a client-side companion application for accessing the IoT platform that may be configured to a display driver component to display the information from the IoT platform across a multitude of display drivers. Further GUI/UX measures may include an alert system, and embodiments around tracking and positioning with weather/climate information. In one aspect, the IoT Platform program further derives, calculates, and predicts inventory management based on parametrized data obtained from the multi-sensor tracking unit.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views. Therefore, in the drawings.

DETAILED DESCRIPTION

Figure 1A:
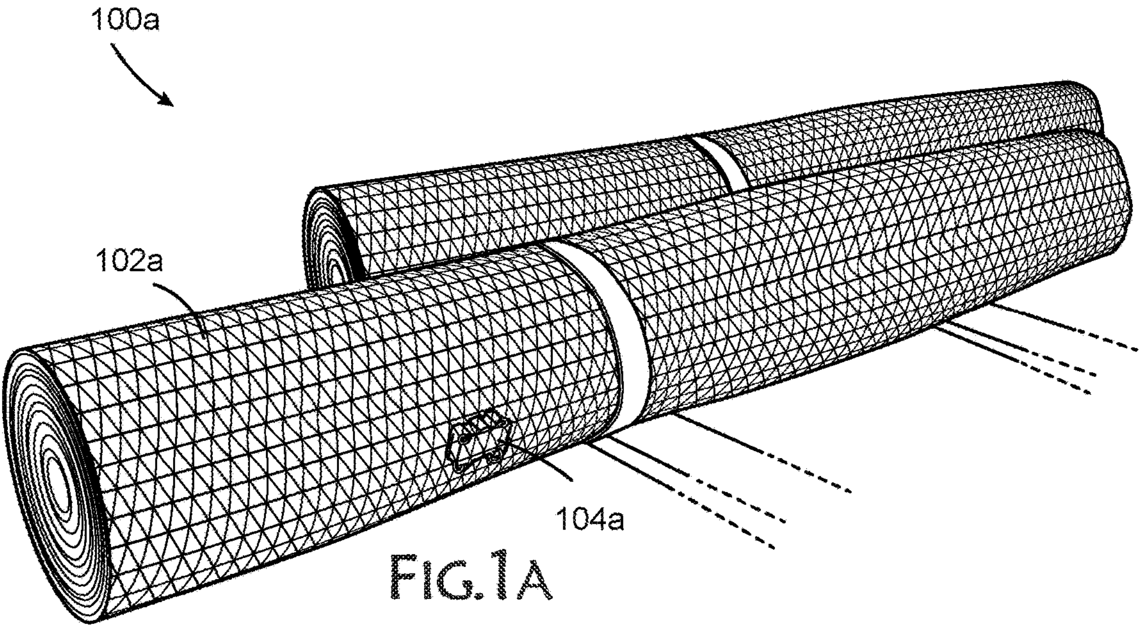
FIG. 1A is an illustration of an example of a geogrid material with a surface mounted tracking unit at a manufacturer or distributor location.

In the following detailed description, reference is made to the accompanying figures, which form a part hereof. In the figures, similar symbols typically identify similar components, unless context dictates otherwise. The illustrative embodiments described in the detailed description, figures, and claims are not meant to be limiting. Other embodiments may be utilized, and other changes may be made, without departing from the scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

I. Example Embodiments

In one aspect an IoT platform is disclosed, wherein the IoT platform is configured on a server as a host, and may be connected to by a plurality of client computing devices. The client computing devices may be general computing devices, such as mobile computing devices, or special purpose computing devices such as bar code scanners. Further, said device is typically configured with a display for viewing information delivered and synthesized by the IoT platform running on a cloud or remote server. The client computing device may also be equipped with an input device such as a keyboard or touch screen, and may serve to relay updates and information to the IoT platform. In this aspect, the logistics features of managing and tracking geogrid material may be updated in real-time based on GPS positioning from the multi-sensor tracking unit, or through scanning of a bar code or QR code that allows entry from a client computing device of information into the IoT Platform. In most cases, the IoT platform information is derived from data obtained from the multi-sensor tracking unit, and can include positioning information (GPS coordinates, latitude longitude, duration at coordinates) along with environmental attributes such as temperature, ambient light, ambient moisture, gyroscope readings, strain readings, salinity, and more.

The server hosting the IoT platform application may be a cloud server, such as cloud servers offered by Microsoft Azure™, Amazon Web Services™, or Google Cloud™ to name a few. Further, the server may be a standalone sever that is interfaced with a network, or a remote server. Additionally, the server may be able to rapidly deploy and enlarge the repository based on demand, thus provisioning additional data repositories or stores as information from one or more multi-sensor tracking units accumulate, thus providing ample storage and space for administering analytics such as machine learning functions over time, series position data and optimization algorithms of the corresponding data retrieved from the tracking units, third party API's (for weather results on transportation or install location), and other sources of data such as logistics data and storage information, sales and warehousing applications, GIS systems, weather systems, and climate information.

The IoT platform may be configured with software that is equipped with various engines, such as a geo-tracking engine, wherein the geo-tracking engine receives data from one or more GPS tracking units comprised in the multi-sensor tracking unit, that is then attached to a geogrid material and at timed increments or based on events (geo-fences, wireless communication, etc.) transmit a signal with information about the multi-sensor tracking unit. Information may include location, time, temperature, ambient light, gyroscope data, unique number or identifier for the grid material, or other manufacturing details about the geogrid material, such as type of polymeric material, whether it has additives, the pattern, the aspect ratio, etc. of the geogrid material. Further information may derive through use of an API, for example, the time and location may interact with a weather API, or climate API, to generate an accurate weather reading of the multi-sensor tracking unit and thus the environment the geogrid material was exposed to. Such information may lead to insights into warranty offerings, product durability, location of install, and allow further data and information as to the lifecycle of the geogrid material.

Lastly, the additional information such as final install location may be derived from an engine on the IoT platform based on at least the ambient light sensor, or location information, or RFID interface. Wherein the ambient light sensor may show no light detected over a period of time, calculate backwards to the date of the first disappearance of lux, and then derive an estimated date of install based on the fixed GPS positioning and lux strength. Similarly, the RFID interface may use communications to check in or check out geogrid material and to check that it was installed. In this aspect, an RFID interface or bar code (QR code) may be scanned or may be triggered by client computing devices, thus tracking the geogrid material and supply at a given distributor.

In another aspect, a tracking unit is mounted to a geogrid material post manufacture, while still at the manufacturing facility. Geogrid materials include and comprise polymeric geogrids, geofabrics, and geotextiles. The multi-sensor tracking unit may be placed in a shroud or dust covering, or protective or weatherproofing case that allows the sensitive electrical equipment and sensors to function, yet protecting it from the elements. The multi-sensor tracking unit may be affixed by means such as glue or zip ties, or may be configured with specialty snaps that may allow recovery of the tracking unit on final delivery. In other aspects the multi-sensor tracking unit may remain attached to the geogrid material for lifecycle tracking. Further, the multi-sensor tracking unit may have up to several years of battery life, and may even, in some situations be equipped with a small solar cell configured to the housing to provide additional usage time and increase in the frequency of data reporting. Further, the multi-sensor tracking unit may send a signal at certain intervals or at set times, including at intervals of less than a minute, five minutes or less, and less than sixty minutes. The intervals may even be set to days, weeks, or years, depending upon how long the battery will remain and the intended purpose of the installation of the multi-sensor tracking unit. Each data request or transmission depletes the battery and thus frequency must be balanced against usable information. The multi-sensor tracking unit may be configured to transmit information it obtains via a cellular network, a satellite network, and through a global positioning system ('GPS'). The transmitted information is stored on a server/repository/database configured on an IoT platform that may run various algorithms and communicate with a plurality of API's to derive additional information based on the original information provided by the multi-sensor tracking unit. Further, the IoT platform hosted on a server is configured to communicate to a plurality of client devices for viewing insights, providing data to the platform, and performing calculations on the data through the IoT Platform.

In one aspect, the IoT platform hosts a map feature and a summary feature that shows a summary of the tracking units' locations as it moves along with the geogrid material, and may be configured with an API to display map positioning, weather information, and various attributes about the geogrid material—such as a unique ID, and product name. Further, the IoT platform is configured to incorporate API data, such as weather, climate, logistics, and allows derivation of insights from the data acquired from the multi-sensor tracking unit to develop a story or timeline of travel, also indicating transit time and final positioning or install location.

II. With Reference to the Figures

FIG. 1A is an illustration of an example of a geogrid material with a surface mounted tracking unit at a manufacturing or distributor facility 100*a*. In the example, a surface mounted multi-sensor tracking unit 104*a* is attached to a geogrid material 102*a* via plastic ties. The multi-sensor tracking unit 104*a* may also be configured to the geogrid material with permanent or non-permanent assemblies, including adhesives, tapes, wraps, ties, or by entangling the tracking unit within the polymeric substrate of the geogrid material. In some aspects the tracking unit may be placed on the geogrid material during manufacture and may be "melted" onto the geogrid material. In other aspects it may be placed on post-processing, in further aspects it may be applied secondarily after leaving the manufacturing location and employed at the stage of shipping.

The multi-sensor tracking unit may also be placed in a protective housing or sheathing that protects the internal circuitry and computing equipment from transit, and while buried with the geogrid. Geogrid materials may face extreme elements in transit and may also be stored for long periods of time in open elements. Thus, the protective housing may also enclose spare batteries or additional items such as a solar cell that would allow replenishing of the onboard battery system. The protective housing may be the housing of the tracking unit itself, or an additional housing unit may be applied. The protective housing may further be IP55 water and dust resistant.

In the example of FIG. 1A, the geogrid material has undergone post processing and is wrapped, tagged, and stacked awaiting shipment. Information conveyed on the print tags or other writing may be digitally transmitted or imprinted, or stored on the multi-sensor tracking unit, thus alleviating the need to print and tag items from the manufacturing facility, and further aiding in logistics. In one aspect, the multi-sensor tracking unit serves as an onboard hard drive or data repository that may be in communication with the one or more client computing devices for accessing digitally stored information. Further, the tracking unit may be installed early on in the manufacturing process and serve as an aid throughout, including post processing steps that may include spraying with additives.

Figure 1B:
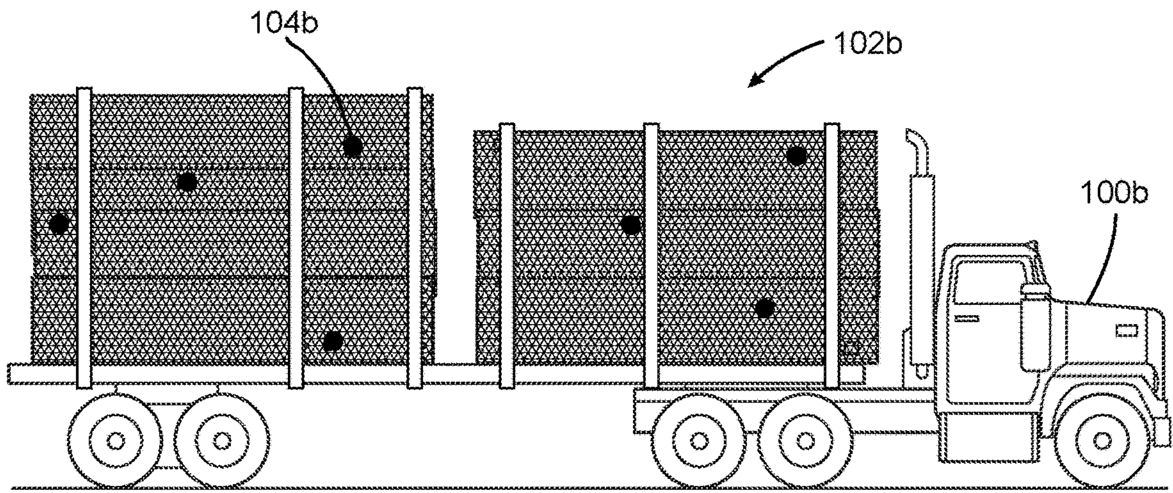
FIG. 1B is an illustration of the example of geogrid material from FIG. 1A in transit via a tractor trailer.

Referring to FIG. 1B, is an illustration of an example shipment via a tractor trailer/lorry 100*b* of geogrid material 102*b* with the multi-sensor tracking units 104*b*. In this aspect, the geogrid material 102*b* is often exposed to the elements, such as direct sunlight, as well as weather patterns of the transportation route. The multi-sensor tracking unit is configured to provide tracking, but also readings such as ambient light to determine if the geogrid material was directly exposed to sunlight and for what duration, to assist in calculating usable lifetime and any performance reduction based on exposure.

Figure 1C:
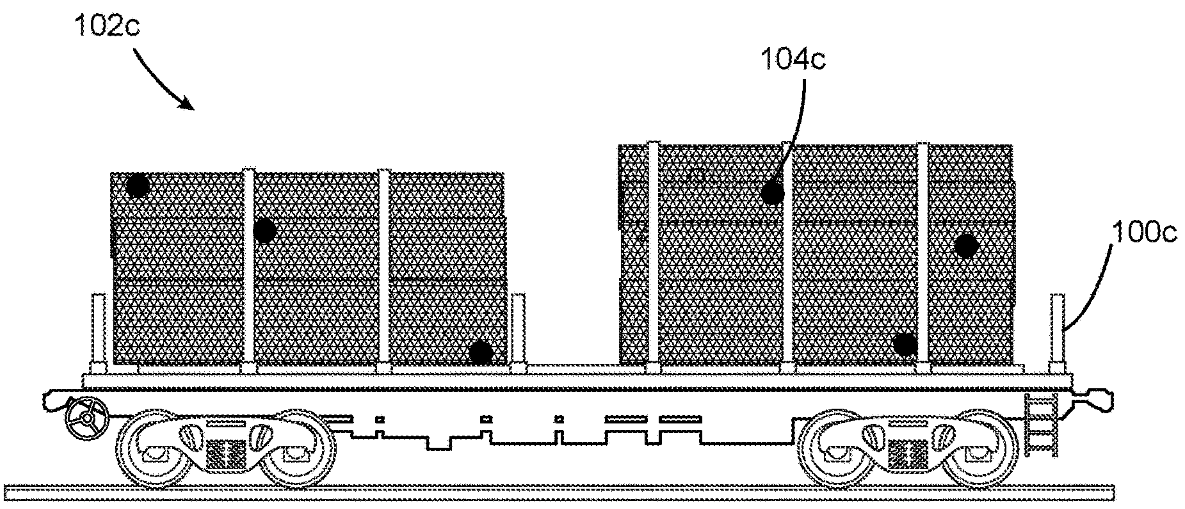
FIG. 1C is an illustration of the example geogrid material from FIG. 1A in transit via a rail car.

Referring to FIG. 1C, is an illustration of an example shipment of geogrid material with the multi-sensor tracking units via rail car. In this aspect the rail car 100*c* is at times, an open air car, and thus the geogrid material 102*c* may be exposed to sunlight at various degrees, as well as compaction from the load, and other environmental factors. Continuing, in this aspect, the multi-sensor tracking units 104*c* are attached via zip ties or plastic reinforcements to bind through the open apertures of the geogrid material. For geofabrics, the multi-sensor tracking units may be attached via an adhesive, or sewn on, or otherwise attached with polymeric fasteners.

Figure 2:
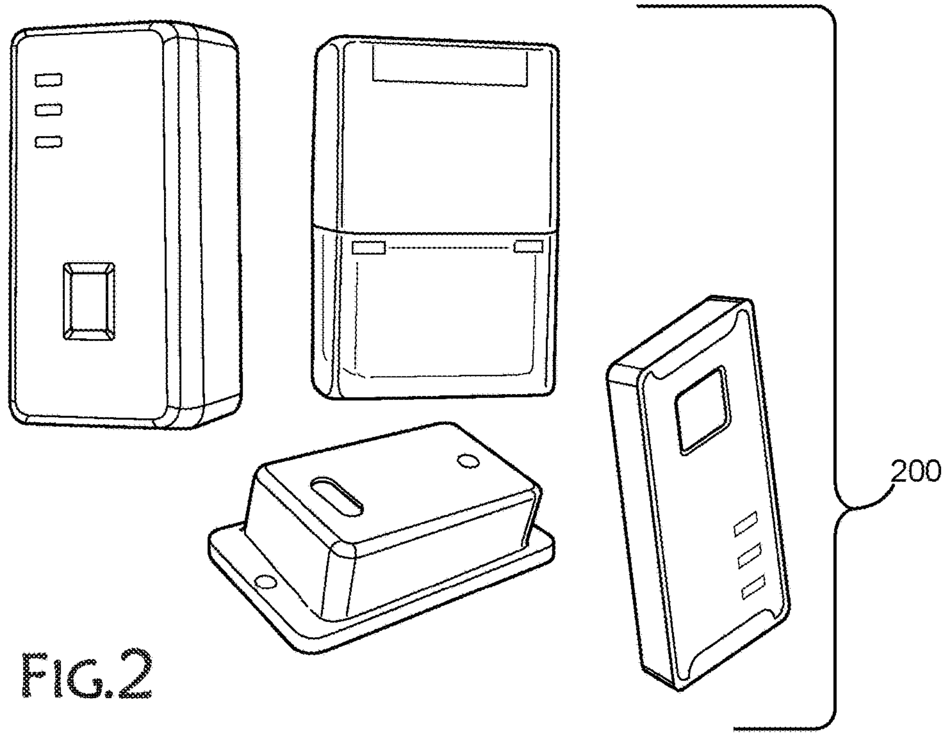
FIG. 2 is an illustration of an example of multi-sensor tracking units that are configured with the geogrid material.

Referring now to FIG. 2, an illustration of an example of various tracking units or modules 200 and form factors. These units may be combined with other sensors and computing devices to form a multi-sensor tracking unit. Further, they may be in isolation, wherein the tracking unit itself forms the multi-sensor tracking unit, as the IoT Platform may derive or calculate weather, moisture, ambient light, based on GPS coordinates and an API layer to repositories storing such data.

In this example, the tracking modules may take various shapes and sizes and may be designed or purpose built for configuring to geogrid. In other aspects, the tracking unit may be an off the shelf tracking unit with a protective sheath. In other aspects, the tracking unit or module may be an off the shelf product that is adapted or configured to affix to a geogrid material.

Examples of tracking units comprised in the multi-sensor tracking unit include units from manufacturers such as Optimus™, Trak-4™, Lonestar Tracking™, Linxup™, to name a few. In a preferred aspect, the multi-sensor tracking unit is a tracking unit configured with additional sensors, so as to not only relay positioning, but also accumulate data from moisture sensors, ambient light sensors, strain gauges, gyroscopes, and other sensors that may allow insight into the lifecycle of the geogrid material from manufacturer through distribution, to final installation. In one aspect, battery size for a multi-sensor tracking unit may last from as little as a few days and up to seven years. Battery life may be impacted by frequency information is sampled and transmitted, as well as physical size of the tracking unit. Further, the battery may be augmented by use of a solar cell or a piezoelectric charge apparatus.

The various multi-sensor tracking units may be affixed to the geogrid material via physical, mechanical, or chemical means, such that the multi-sensor tracking unit remains with the geogrid material. In some instances, the multi-sensor tracking unit may be removed and reused for an additional deployment of geogrid material. In other instances, the multi-sensor tracking unit may remain with the geogrid material, thus continuing to acquire data from the deployment zone and developing a lifecycle image of the geogrid material.

Figure 3:
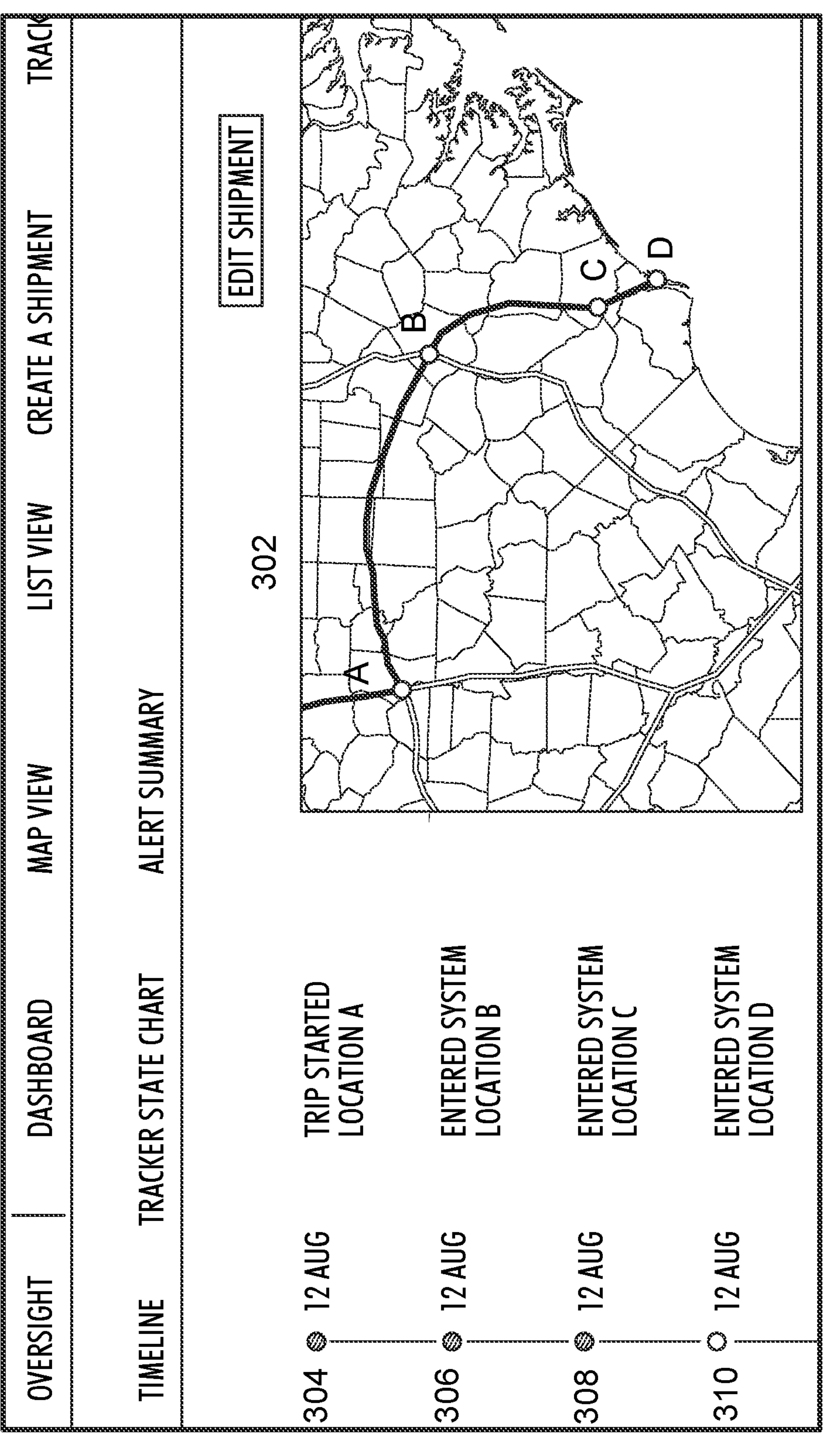
FIG. 3 is an illustration of an example IoT platform dashboard with information generated by a multi-sensor tracking unit.

Referring now to FIG. 3, an illustration of an example graphical user interface/user experience (GUI/UX) to the IoT platform 300 viewed from a client computing device, with information compiled from the multi-sensor tracking unit. The IoT platform is typically hosted on a server and accessed over the Internet by a plurality of client computing devices (phones, tablets, computers). In one aspect, an application module within the IoT platform is disclosed. In the example a display of an application module is loaded into memory configured on a client computing device, and generates a map visual 302 or timeline, as seen in FIG. 3 of an example IoT platform GUI. Thus, the disclosure herein may form an application module and may be configured with a client computing device to process programmable instructions, those instructions may include logistics instructions, as well as general data viewing from any number of multi-sensor tracking units. The timeline or map may be a visual generated from the data acquired by the IoT platform, through the network, to the multi-sensor tracking unit. Thus, each timeline or map may be configured to one or more of the multi-sensor tracking units, and this form a unique graphical representation of inventory, along with comprehensive product details, manuals, and resources.

In one example, the application module will load into memory, typically RAM, and further communicate through a bus controller to transmit instructions to the processing unit. The processing unit is configured to a system bus that provides a pathway for electric signals to rapidly move data into the system and to the processing unit. A typical system bus maintains control over three internal buses or pathways, namely a data bus, an address bus, and a control bus. The I/O interface module can be any number of generic I/O, including programmed I/O, direct memory access, and channel I/O. Further, within programmed I/O it may be either port-mapped I/O or memory mapped I/O or any other protocol that can efficiently handle incoming information or signals.

The application module executing on the client computing device receives information from the server via the IoT platform, and in some instances delivers content from the IoT platform to a client computing device by notification or alert. In other aspects, the application module is a browser window accessing the IoT platform. In others it may be a stand-alone application installation, or a side loading application, such as an application on a mobile computing device that is enabled through an application store. In application form, some of the resources may be downloaded onto the client computing device, and the information refreshed from the IoT platform which is in communication with a plurality of multi-sensor tracking units. Further, the client computing devices may push information through the application to the IoT platform which may change the database or repository, such as changing fields by updates provided by location sensing on the multi-sensor tracking units in comparison to the client computing devices. In this aspect, the client computing device may scan a barcode or use wireless communication such as Bluetooth, or NFC, to locate a specific multi-sensor tracking unit, and in doing so may push information to the IoT platform regarding location, or confirming the tracking unit status.

In the example of FIG. 3, a high level overview of a shipment of geogrid is disclosed. In the example, a dashboard is available, as well as a map view 302, a list view (304, 306, 308, 310), and the ability to create a shipment from within the IoT platform. Further, a summary of information transmitted from the tracking unit includes location positions and a map of said location positions. Additional information such as multi-sensor tracking unit state chart is available, as well as an alert summary, wherein all alerts are summarized or organized for client viewing. Further, the IoT platform may provide reporting on items such as inventory based on count at a given location. For example, the manufacturer may ship the geogrid material to a distributor, wherein it may reside and only be invoiced when the multi-sensor tracking unit indicates the geogrid material has left a specific geographic region or fence. Thus, invoicing and billing logistics may be administered by viewing the geogrid material available, including the ability to re-route particular geogrid material from warehouses or distributor locations. Thus, the multi-sensor tracking unit serves as an inventory management tag, and allows integration into core software solutions for invoicing and supply handling. In one aspect, the IoT platform may serve to integrate as a warehouse database or on site database for storing inventory and materials. This type of reporting aids in logistics and may be established for auto shipping and moving of geogrid materials to locations that experience a draw down in materials.

Continuing, in the map aspect 302 on the client computing device, viewing the IoT platform, a trip started location A 304 indicates the manufacturer site, or the site of installation of the multi-sensor tracking unit. Next, the entered system location B 306, indicates a stopping point or a data point received by the IoT platform, this may be a distributor site, a warehouse, or simply a timed response based on the frequency of transmissions. Similar, the entered system location C 308 also indicates a third data point or location obtained from the multi-sensor tracking unit. Lastly, the entered system location D 310 may indicate an installation site, or a shipment delivery to a distributor or an installer. In any event the data points rendered on the map interface of the client application on the client computing device is generated from data obtained by the multi-sensor tracking unit, along with the IoT platform, and any API calls that may bring in additional repository data.

Figure 4A:
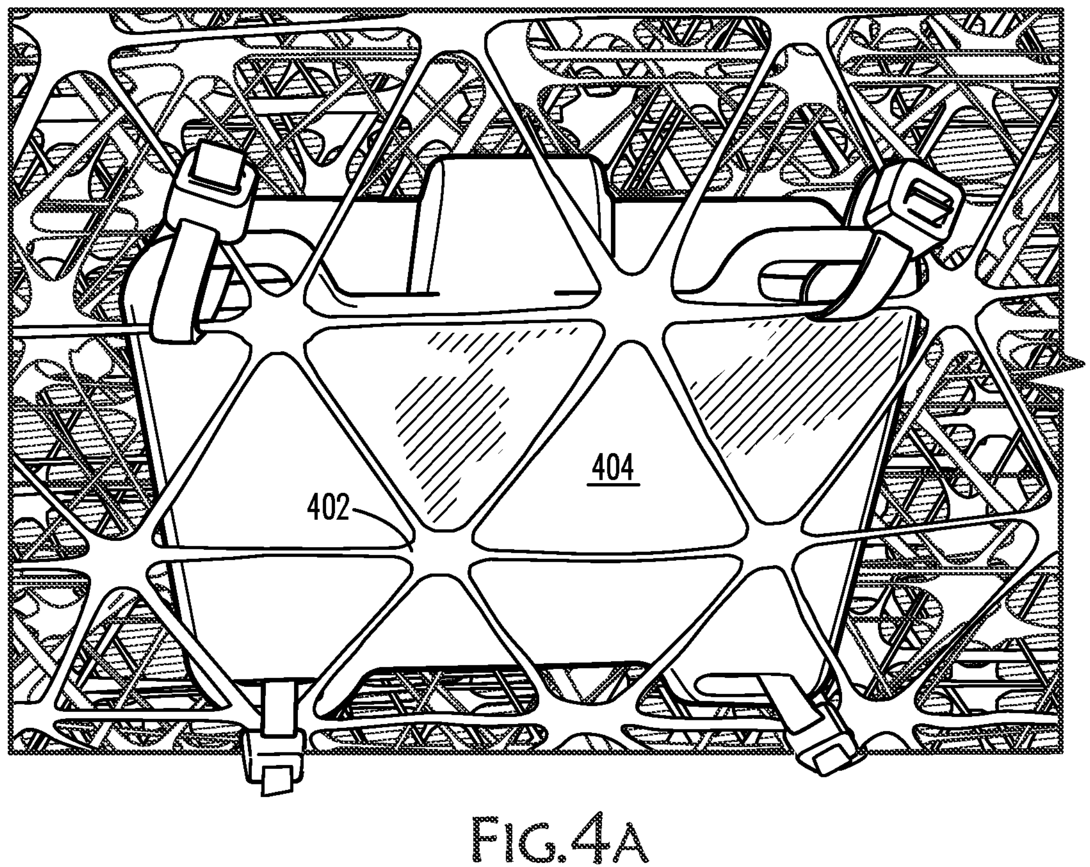
FIG. 4A is an additional example of a multi-sensor tracking unit in a housing mounted to a geogrid material.

FIG. 4A is an additional example of a multi-sensor tracking unit in a housing 404 mounted to a geogrid material 402. In the example, zip ties are configured to a housing of the tracking unit and placed on members of the geogrid material so as to attach firmly and prevent the loss of a tracking unit while in transit. The tracking unit may be further painted or otherwise marked for identification and ease of locating when installing. In some aspects, the tracking unit is intended to be buried and installed with the geogrid so that the ambient light sensor may indicate its final position and study of the transportation pathway may be better understood. In other aspects it is removed, the batteries replaced or recharged and it is upcycled into further applications of geogrid material tracking, thus allowing the cycle to repeat in perpetuity.

Figure 4B:
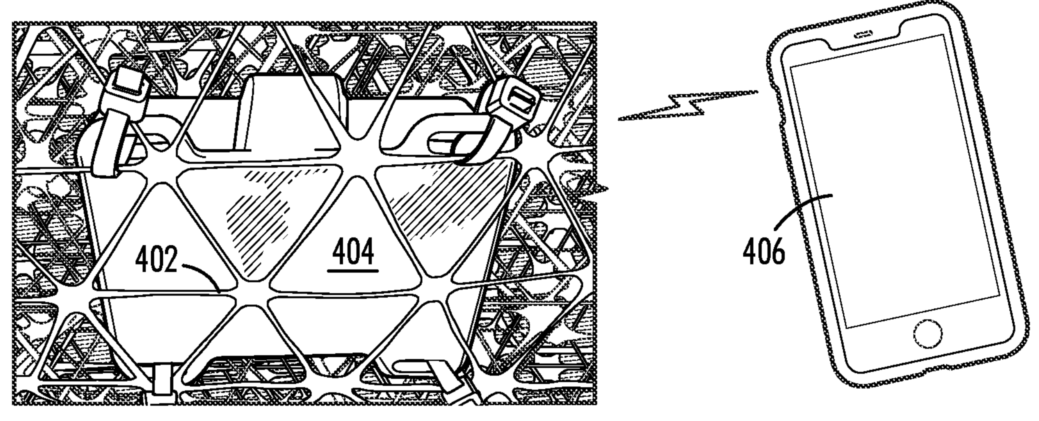
FIG. 4B is an example of a multi-sensor tracking unit in a housing mounted to a geogrid material in communication with a client computing device.

Referring now to FIG. 4B, an example of the multi-sensor tracking unit 404 of FIG. 4A in communication with a client computing device 406, wherein the client computing device may be "checking in" with the multi-sensor tracking unit at a site installation, or pulling the product information and credentials to assure the product is genuine along with a reference to a digital brochure or other information that may be provided by the IoT platform. Such information may include a unique product identifier, a product name, product specifications (size, material, weight, batch number, manufacturing site, manufacturing date), as well as links to brochures, installation instructions, usage guides, warranty information, and general product resources.

Figure 5:
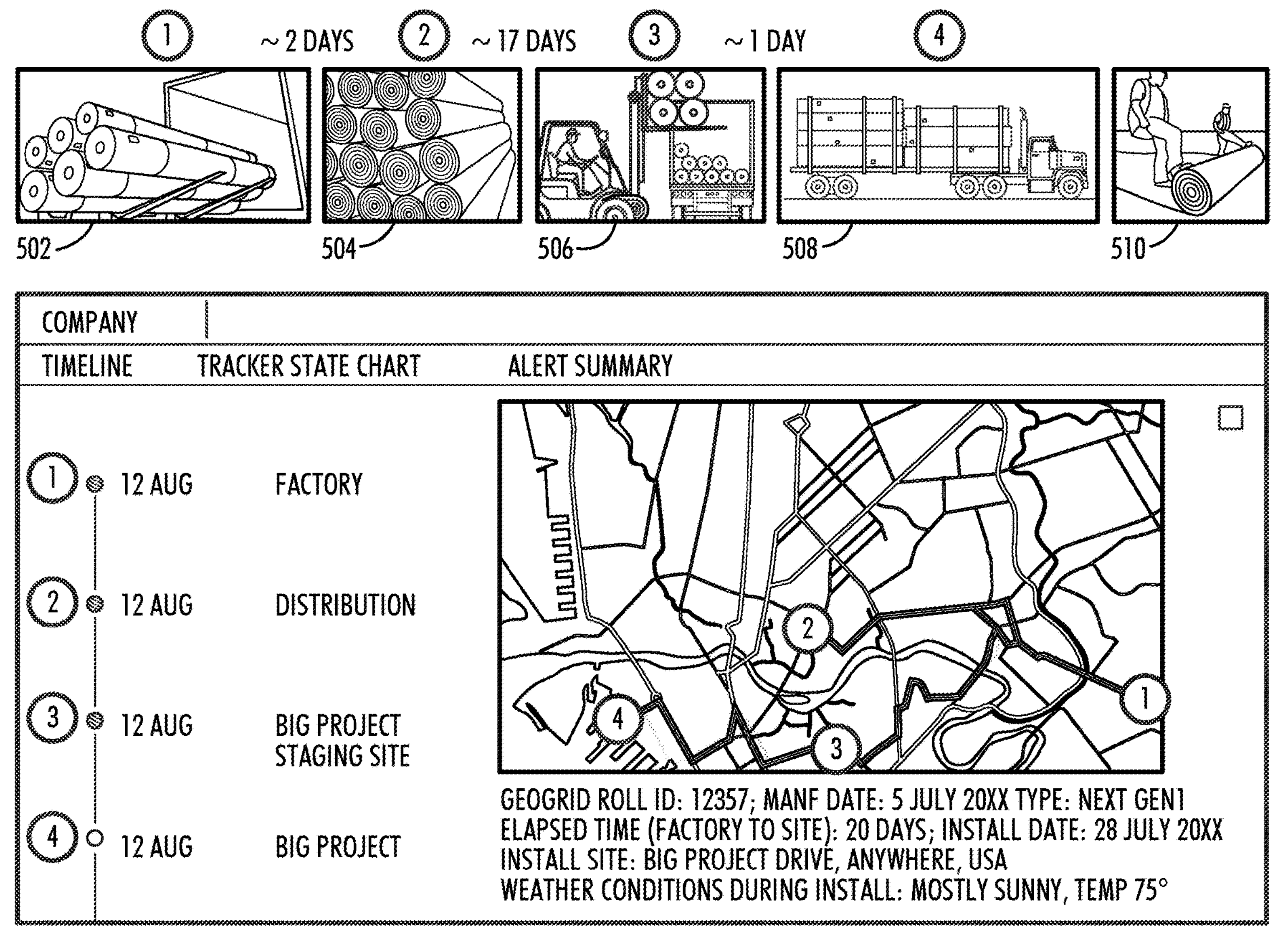
FIG. 5 is a step diagram illustrating an example series of implementing a tracking and logistics method as disclosed herein.

FIG. 5 is a step diagram illustrating an example series of implementing a tracking method disclosed herein. In the example, the geogrid material is tagged at the factory 502 where the multi-sensor tracking unit is installed by a manual process or by automation in the production line. Next, the geogrid material is transported to a distribution center 504, wherein it may stay in storage for a period of time before being selected for shipment to a customer staging site. Next, the geogrid material is selected 506 and shipped 508 to a customer staging site, such a site is often near the final installation location and may leave the geogrid material under the elements (sunlight, rain, snow). Next, the geogrid material arrives at a final job site 510, wherein the tracking unit is removed and the geogrid is installed. In other embodiments the tracking unit may be left in place to gather additional data, or as an end of lifecycle implementation for long term performance tracking. Through this example chronology, the geogrid was placed in multiple environments, entered multiple site locations for logistics and warehousing, and through it all the manufacturer may not know the ultimate end customer or installation site. Thus, the disclosure herein provides new insight for tracking and providing quality assurance, warranty, and performance indication of the geogrid material. Additionally, the manufacturer may gain valuable insight into the where the geogrid is installed as well as the conditions in which it traveled, including the duration spent at each stage, and whether or not the transportation and storage conditions affect the geogrid material performance. Knowing this information allows the IoT platform to perform additional metrics on product performance. Further, the tracking and ability to communicate with the multi-sensor tracking unit allows a distributor network to resolve inventory issues by moving shipments of geogrid materials at distribution centers that are not actively being depleted. Thus, the multi-sensor tracking unit operates as a smart device for logistics, and allows the manufacturer to understand supply shortages and to better meet the needs of distributors and end consumers.

In one aspect, in the example of FIG. 5, the application GUI may be displayed within a client computing device provides updates and progress of a shipment, including time spent at various stages and the general location, weather, and other information available from the multi-sensor tracking unit affixed to the geogrid material. Additional information, as discussed earlier, may be accessed from an onboard analytics engine within the IoT platform that includes a unique geogrid material ID, the manufacturing date, the type of geogrid, elapsed time the geogrid spent from factory to install site, the install date, the name of the install project, and weather conditions throughout the transit operation, to name a few.

Not depicted in FIG. 5, a geofence may be utilized in the reporting and warehousing aspect, as well as in the production line. Wherein when the tracking unit crosses the fenced threshold an entry is made within a relational database, such entry may update the status or inventory, or may be utilized for shipping logistics. Geofences also enable structuring a material zone, or area in which materials may be tracked, including with information logged such as movement, storage, and use within a geotechnical engineering project.

Figure 6:
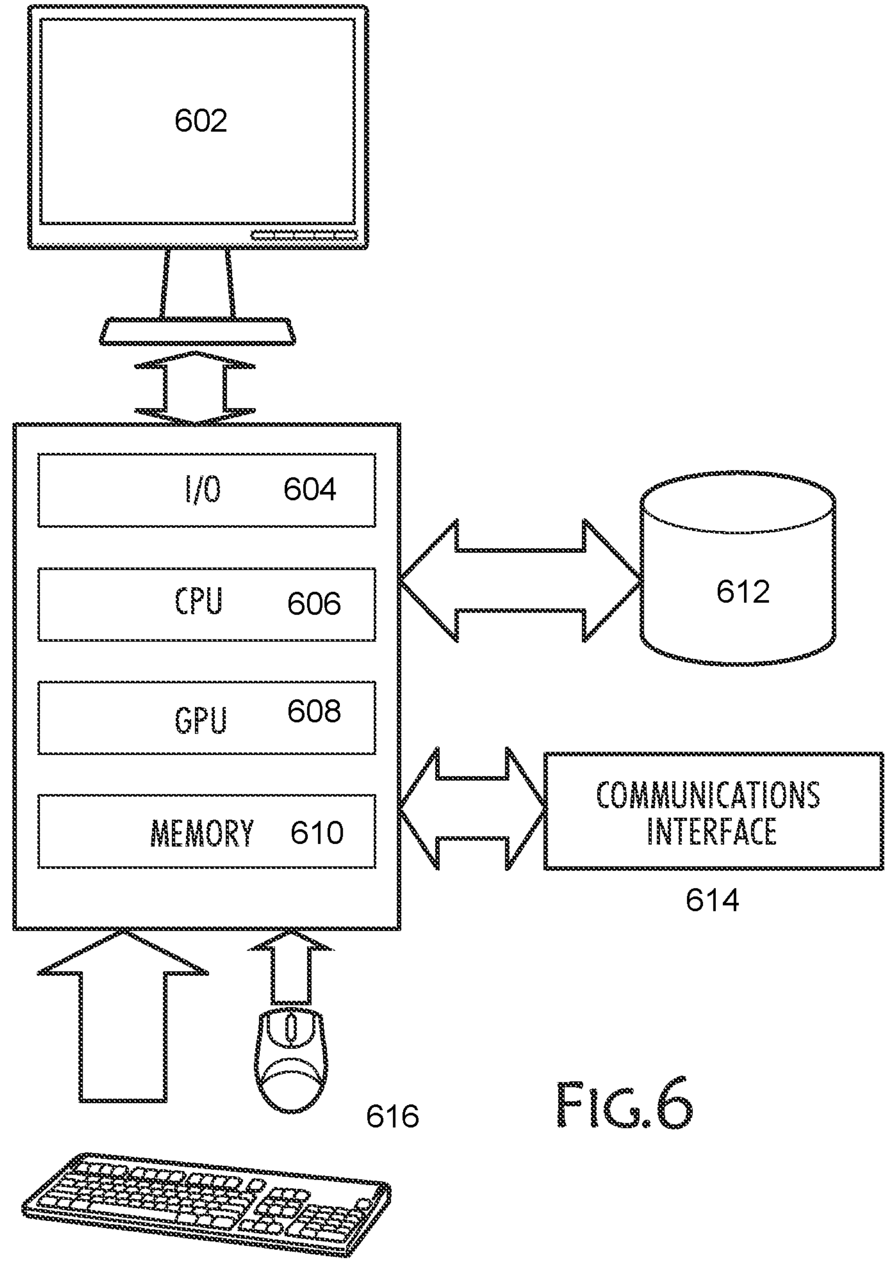
FIG. 6 is an illustration of an example computing system and server that may host an IoT platform for tracking as disclosed herein.

Referring now to FIG. 6, an illustration of an example client computing system and server that may host an IoT platform for tracking and logistics of geogrid material is disclosed herein. In the example, the server 612 is accessed through a client computing device 602, including peripherals such as a mouse, a keyboard, and a monitor (collectively, 616). This configuration may be at the manufacturer site and may directly interact with billing software, manufacturing software, and other modules to produce an overall visualization of operations as an enterprise resource management solution. Continuing, the communications interface 614 connects to the client computing device, wherein the IoT platform is hosted on a server 612, and wherein data from the one or more multi-sensor tracking units is transmitted and incorporated into a database repository on the server 612. The communications interface may be any networking module capable of communicating across the Internet. The client computing device is often configured with memory 610, a GPU 608, a CPU 606, and I/O capability 604. In one aspect, the computing device may log in as an administrator and access features on the IoT platform that are not readily available to clients. In other aspects, the computing device may log in as a client, and access the features, such as map overview, tracking, summary, current location, weather, duration, transit time, and more.

Furthermore, according to the example in FIG. 6, there may be a plurality of servers, wherein servers may be a cloud computing network, in communication with the multi-sensor tracking units. Such communications may be radio frequency communications such as cellular communications as well as GPS communication protocols, so that information, including positioning may be transferred from the tracking units to a server for executing program instructions and deriving insight.

Figure 7:
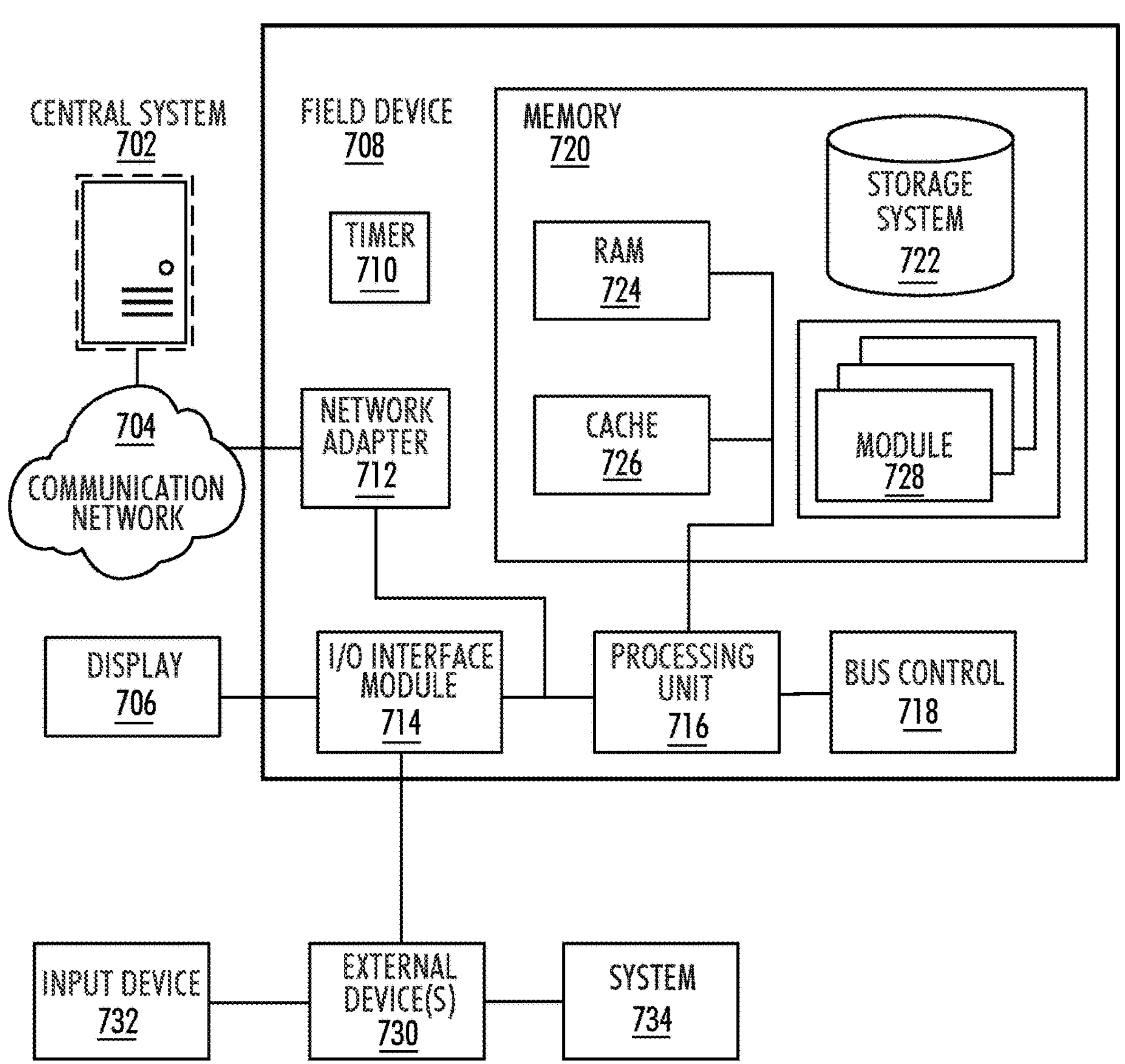
FIG. 7 is an illustration of an example computing system for implementing the disclosure herein.

Referring now to FIG. 7, an illustration is provided of an example computing system for implementing the disclosure herein. In the example of FIG. 7, a general purpose computing device is disclosed that may comprise the client computing devices and some aspects of the server that is hosting the IoT platform. The general purpose computing device may also be embodied in a mobile computing platform or field device 708 such as a smart phone, cellular phone, smart watch, wrist watch, eyeglasses, or AR glasses, to name a few. In other aspects, a general purpose computing device may be a microcontroller, and may be adapted for specific elements of the disclosure herein, or even further, a special purpose computing device may form elements of the disclosure. In the example embodiment of FIG. 7, the computing device is comprised of several components. First, the computing device is equipped with a timer 710. The timer 710 may be used in applications for generating time delays for battery conservation or to control sampling rates, etc. The computing device is further equipped with memory 720, wherein the memory 720 contains a long term storage system 722 that is comprised of solid-state drive technology (e.g. NAND) or may also be equipped with other hard drive technologies (including the various types of Parallel Advanced Technology Attachment, Serial ATA, Small Computer System Interface, and SSD). Bus control 718 allows instructions to transmit between the various field device 708 components. Further, the long term storage may include both volatile and non-volatile memory components. For example, the processing unit 716 and or engine of the mobile application/module 728 may access data tables or information in relational databases or in unstructured databases within the long term storage, such as a NAND or other SSD. The memory 720 of the example embodiment of a computing device also contains random access memory (RAM) 724 which holds the program instructions along with a cache 726 for buffering the flow of instructions to the processing unit. The RAM 724 is often comprised of volatile memory but may also comprises nonvolatile memory. RAM 724 is data space that is used temporarily for storing constant and variable values that are used by the computing device during normal program execution, such as module 728 execution by the processing unit. Similar to data RAM, special function registers may also exist, special function registers operate similar to RAM registers allowing for both read and write. Where special function registers differ is that they may be dedicated to control on-chip hardware, outside of the processing unit.

The computing device in FIG. 7 may be applicable to both equipment configured on a server and equipment configured on a client device as disclosed herein. Further, application instructions may exist on either the server or client device. In both examples the disclosure herein provides for executing, storing, transferring, processing, or otherwise calculating, tabulating, or performing tasks through instructions provided to a central processing unit on a computing device.

Continuing, a network adapter 712 is used for communications to a central system 702 via a communication network 704. The communication network may be any network, such as wired or wireless, and even satellite. The central system 702 in this aspect is the cloud server hosting the IoT platform. As is known, the central system may comprise many servers located geographically independent from one another and still perform the same intended function of the IoT platform.

Input to the field device 708 may come from a variety of external devices 730, such keyboards, cameras, touch interfaces, and more. Further, an input device 732 may be specifically designated for the client computing device, such as an integrated touch screen in a phone and tablet. Lastly, the field device 708 may connect to additional field devices or systems 734 through either the network adapter or I/O interface module 714.

Figure 8:
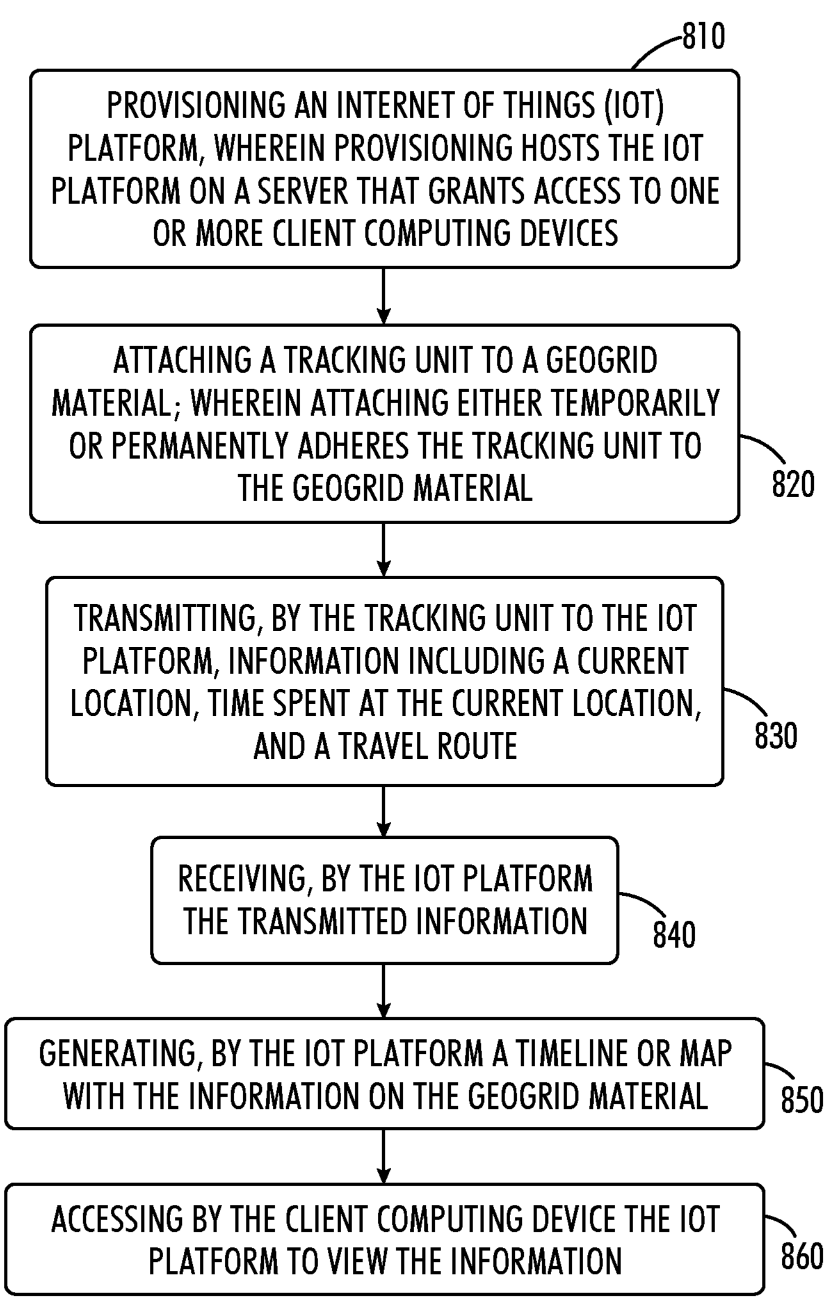
FIG. 8 is an illustration of a flow chart of an example method of performing tracking herein.

Referring now to FIG. 8, an example method of the system herein for tracking and monitoring geogrid material. In one aspect, the method begins by provisioning an IoT platform 810 on a server, wherein provisioning loads the IoT platform into memory, makes calls to the database/repository of information, such as the unique ID of each multi-sensor tracking unit, and further grants access credentials to one or more client computing devices for viewing a user interface and facilitating information and instructions to users.

Next, in the example method, the multi-sensor tracking unit is attached to geogrid material 820, wherein it is designed to remain with the geogrid material through post manufacturing, to a distributor, and to an ultimate end use/installation. In some aspects the multi-sensor tracking unit remains on the geogrid material through post installation and continues to serve as a geolocation mark, as well as continual data accumulation from the one or more sensors on the multi-sensor tracking unit. In other aspects, the multi-sensor tracking unit is removed from the geogrid material and deployed on a new manufactured geogrid material, thus, the digital nature of the onboard storage and interaction with the IoT platform allows for rapid reconfiguration of the multi-sensor tracking unit to allow a continuous use lifecycle of each multi-sensor tracking units.

Continuing, the multi-sensor tracking unit transmits information back to the IoT platform 830 through wireless protocols, and may be done by connecting with or configuring to a client computing device, or through satellite and GPS satellite communications. Next, the server receives the information from the multi-sensor tracking unit 840 and stores it into a configured repository, wherein the IoT platform accesses and generates a unique visual map 850 by calling a map API such as Google Maps, and by placing GPS markers at the frequency intervals. Additionally, the IoT platform may call an API for weather, and confirm other onboard sensors, such as a moisture sensor.

Lastly, a client computing device may access the IoT platform 860 on a client side application, and may interact with the IoT platform by viewing, editing, and saving content. In one aspect, a client computing device may use near field communications to connect to a multi-sensor tracking unit, and push information to the repository configured to the IoT platform. In such aspects, client computing devices may be able to configure geogrid material at a distributor site. For example, a 40 foot geogrid roll may be cut in half due to damage or client requests, and the multi-sensor tracking unit may be updated at a distributor and information pushed to configure the new dimensions of the geogrid material. Thus, the methods and systems herein aid in eliminating waste, and allow for higher productivity and usage rates of geogrid material.

III. Implementations

The disclosure herein may be best understood by the following claim clauses and implementations:

Clause 1. A hardware implemented method for acquiring data around geogrid from manufacture to installation, comprising: provisioning an Internet of Things (IoT) platform on a server, wherein provisioning hosts the IoT platform on the server that grants access to one or more client computing devices; attaching a multi-sensor tracking unit to a geogrid; wherein attaching either temporarily or permanently adheres the multi-sensor tracking unit to the geogrid; acquiring geogrid information from the multi-sensor tracking unit attached to the geogrid, wherein the geogrid information comprises at least a current location; transmitting the geogrid information acquired by the multi-sensor tracking unit through a wireless network to the IoT platform; generating, by the IoT platform, a timeline or map comprising one or more location points from the geogrid information acquired by the multi-sensor tracking unit; and accessing, by the one or more client computing devices, the IoT platform to view the timeline or map.

Clause 2. The method of clause 1, further comprising calculating by the IoT platform, duration information of time the geogrid spent at a geolocation, and accessing, by the one or more client computing devices, the IoT platform that comprises a timeline or map that includes the duration information.

Clause 3. The method of clause 1, wherein the multi-sensor tracking unit acquires the information at least every 60 minutes.

Clause 4. The method of clause 1, further comprising the IoT platform acquiring weather information based on at least the current location of the multi-sensor tracking unit, and associating the weather information with the timeline or map.

Clause 5. The method of clause 1, further comprising acquiring, from the multi-sensor tracking unit, environmental information comprising temperature, humidity, and an ambient light value, and transmitting the environmental information to the IoT platform, and accessing by the one or more client computing devices the IoT platform that comprises a timeline or map that includes the environmental information.

Clause 6. The method of clause 1, wherein transmitting information acquired from the multi-sensor tracking unit is dependent upon a request from the one or more client computing devices.

Clause 7. The method of clause 6, further comprising decreasing transmission rate frequency from the multi-sensor tracking unit when the geogrid is placed into a geotechnical environment to save on battery consumption, based on at least the ambient light value, or an RFID signal, or a signal from the one or more client computing devices.

Clause 8. The method of clause 5, wherein the environmental information further comprises moisture information and salinity information.

Clause 9. The method of clause 7, further comprising the IoT platform alerting the client computing device when the multi-sensor tracking unit enters the geotechnical environment or when the multi-sensor tracking unit fails to send the information.

Clause 10. The method of clause 1, further comprising transmitting, by the tracking unit, information about when the tracking unit is placed into ground.

Clause 11. A hardware implemented method for inventory management of geogrids, comprising: provisioning an Internet of Things (IoT) platform on a server, wherein provisioning hosts the IoT platform on the server that grants access to one or more client computing devices; attaching a multi-sensor tracking unit to a geogrid; wherein attaching either temporarily or permanently adheres the multi-sensor tracking unit to the geogrid; transporting the geogrid with a multi-sensor tracking unit to a distributor; acquiring, by the one or more client computing devices, geogrid information from the multi-sensor tracking unit attached to the geogrid, wherein the geogrid information comprises at least a current location and a unique product identifier; receiving, by the IoT platform from the multi-sensor tracking unit, a notification the geogrids has left the distributor's location; and triggering a financial transaction based on the geogrid information from the multi-sensor tracking unit that the geogrid is no longer at the distributor location.

Clause 12. The method of clause 11, further comprising calculating inventory at the distributor based on a count of the multi-sensor tracking unit and the unique product identifier.

Clause 13. The method of clause 11, further comprising the IoT platform reporting inventory quantity of the distributor based on at least the geogrid information, to the one or more client computing devices.

Clause 14. The method of clause 12, further comprising scheduling a delivery of additional geogrid based on the count of the multi-sensor tracking units at the distributor.

Clause 15. The method of clause 11, further comprising querying by the one or more client computing devices, the IoT platform for the geogrid information, wherein the querying imports a product name, product dimension, and a date of manufacture from a repository based on the product identifier from the multi-sensor tracking unit.

Clause 16. The method of clause 11, wherein the multi-sensor tracking unit comprises a GPS module, a communications module, a gyroscope, an ambient light sensor, and a moisture sensor.

Clause 17. The method of clause 11, wherein the multi-sensor tracking unit further comprises a hardened enclosure with one or more tabs in which the one or more tabs protrude to allow for the attaching of the multi-sensor tracking unit with a zip-tie.

It should be emphasized that the above-described embodiments and implementations of the present disclosure are merely possible examples of implementations set forth for a clear understanding of the principles of the disclosure. Many variations and modifications may be made to the above-described embodiments without departing substantially from the scope and principles of the disclosure. All such modifications and variations are intended to be included herein within the scope of this disclosure and protected by the following claims.

Therefore, the following is claimed:

1. A hardware implemented method for inventory management of geogrids, comprising:

provisioning an Internet of Things (IoT) platform on a server, wherein provisioning hosts the IoT platform on the server that grants access to one or more client computing devices;

attaching a multi-sensor tracking unit to a geogrid, the multi-sensor tracking unit comprising a hardened enclosure with one or more tabs and allowing for attachment via a connector, wherein attaching either temporarily or permanently adheres the multi-sensor tracking unit to the geogrid;

transporting, through truck or rail, the geogrid with a multi-sensor tracking unit to a distributor;

acquiring, by the one or more client computing devices, geogrid information from the multi-sensor tracking unit attached to the geogrid, wherein the geogrid information comprises at least a current location and a unique product identifier;

receiving, by the IoT platform from the multi-sensor tracking unit, a notification the geogrids have left the distributor's location; and triggering a financial transaction based on the geogrid information from the multi-sensor tracking unit that the geogrid is no longer at the distributor location.

2. The method of claim 1, further comprising calculating inventory at the distributor based on a count of the multi-sensor tracking unit and the unique product identifier.

3. The method of claim 1, further comprising the IoT platform reporting inventory quantity of the distributor based on at least the geogrid information, to the one or more client computing devices.

4. The method of claim 2, further comprising scheduling a delivery of additional geogrid based on the count of the multi-sensor tracking units at the distributor.

5. The method of claim 1, further comprising querying by the one or more client computing devices, the IoT platform for the geogrid information, wherein the querying imports a product name, product dimension, and a date of manufacture from a repository based on the product identifier from the multi-sensor tracking unit.

6. The method of claim 1, wherein the multi-sensor tracking unit comprises a GPS module, a communications module, a gyroscope, an ambient light sensor, and a moisture sensor.

7. The method of claim 1, wherein the one or more tabs protrude to allow for the attaching of the multi-sensor tracking unit with a zip-tie.

8. The method of claim 1, further comprising generating, by the IoT platform, a timeline or map comprising one or more location points from the geogrid information acquired by the multi-sensor tracking unit, wherein the timeline or map is accessible by the one or more client computing devices via the IoT platform.

9. The method of claim 1, further comprising further comprising calculating by the IoT platform, duration information of time the geogrid spent at a geolocation.

10. The method of claim 8, further comprising further comprising the IoT platform acquiring weather information based on at least the current location of the multi-sensor tracking unit, and associating the weather information with the timeline or map.

11. The method of claim 8, further comprising acquiring, from the multi-sensor tracking unit, environmental information comprising temperature, humidity, and an ambient light value, and transmitting the environmental information to the IoT platform, and associating the environmental information with the timeline or map.

12. The method of claim 1, further comprising decreasing a transmission rate frequency from the multi-sensor tracking unit when the geogrid is placed into a geotechnical environment to save on battery consumption based on at least the ambient light value, or an RFID signal, or a signal from the one or more client computing devices.

13. The method of claim 11, wherein the environmental information further comprises moisture information and salinity information.

14. The method of claim 12, further comprising the IoT platform alerting the one or more client computing devices when the multi-sensor tracking unit enters the geotechnical environment or when the multi-sensor tracking unit fails to send the information.

15. The method of claim 1, wherein the connector comprises one of a loop connector or a snap.

16. The method of claim 1, further comprising transmitting, by the tracking unit, information about when the tracking unit is placed into ground.

* * * * *